United States Patent [19]
Ranburger

[11] Patent Number: 5,743,579
[45] Date of Patent: Apr. 28, 1998

[54] DIGGING TOOL

[76] Inventor: Carl W. Ranburger, 12955 68th St., Alto, Mich. 49302

[21] Appl. No.: 760,975

[22] Filed: Dec. 5, 1996

[51] Int. Cl.⁶ .................................................... A01B 1/18
[52] U.S. Cl. ............................................................ 294/50.8
[58] Field of Search ............................. 294/50.5–50.9, 294/53.5, 118; 111/92, 101, 106, 107

[56] References Cited

U.S. PATENT DOCUMENTS

| | | | |
|---|---|---|---|
| 281,137 | 7/1883 | Rhodes | 294/50.8 |
| 429,903 | 6/1890 | Gregg | 294/50.8 |
| 944,552 | 12/1909 | Hefner | 294/50.8 |
| 1,051,029 | 1/1913 | Stephanus | 294/50.8 X |
| 1,222,711 | 4/1917 | Armstrong | 294/50.8 |
| 2,735,712 | 2/1956 | Hart | 294/50.5 |
| 4,042,270 | 8/1977 | Weiland | 294/50.8 |
| 4,489,969 | 12/1984 | Merry | 294/50.8 |
| 5,497,714 | 3/1996 | Schlotthauer | 294/50.8 X |

*Primary Examiner*—Johnny D. Cherry
*Attorney, Agent, or Firm*—Waters & Morse, P.C.

[57] ABSTRACT

A digging tool of the invention has first and second shovel blades that are aligned in face-to-face orientation and pivotally connected to move clamshell style between open and closed positions. A handle extends from each shovel blade to a grip. When the digging tool is in the open position, the handles criss-cross or overlap and converge from the blades to an overlap point and then diverge from the overlap point to the grips. In the closed position, the shovel blades close toward one another and the handles diverge relatively slightly from the shovel blades to the grips.

7 Claims, 2 Drawing Sheets

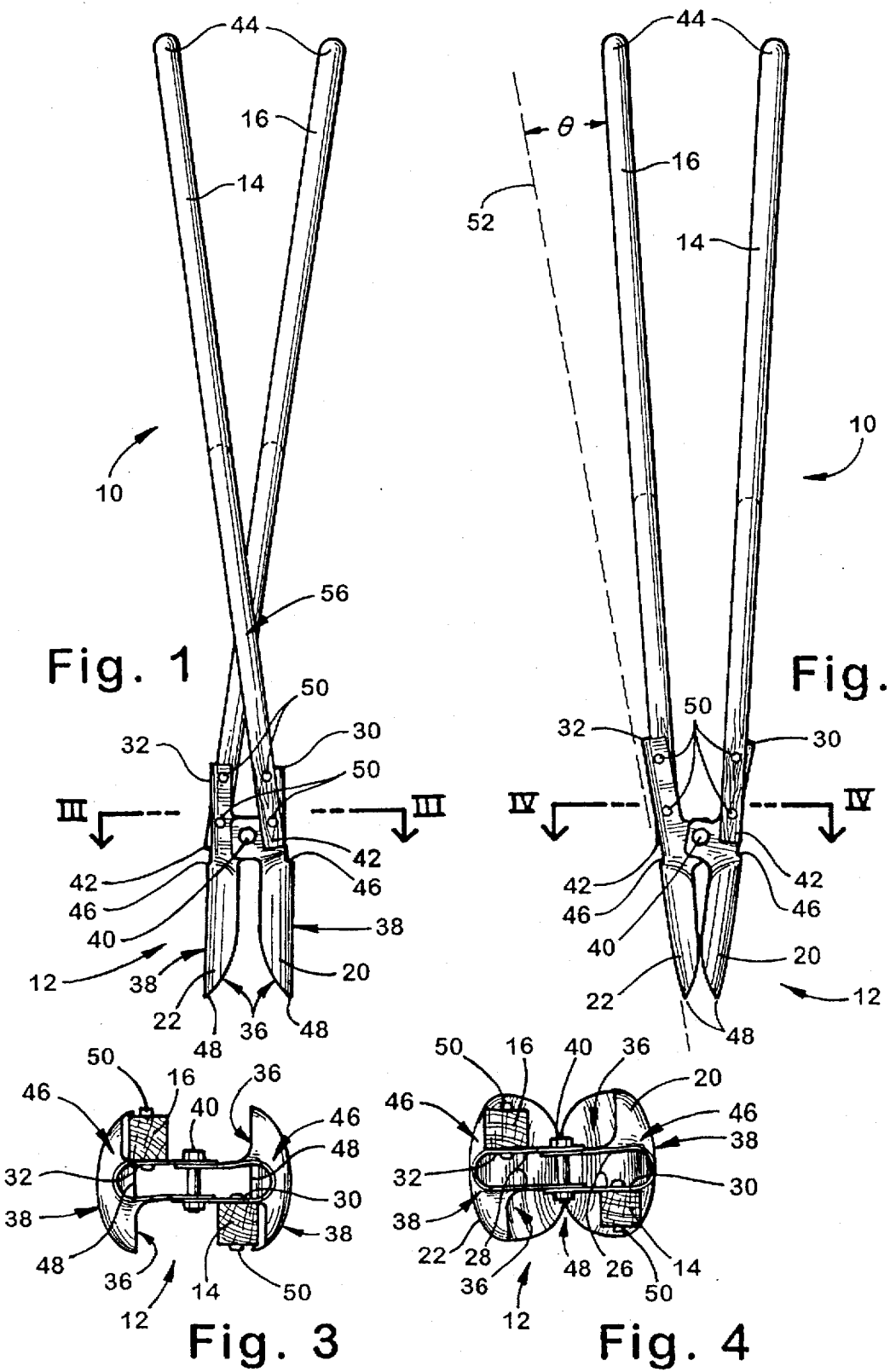

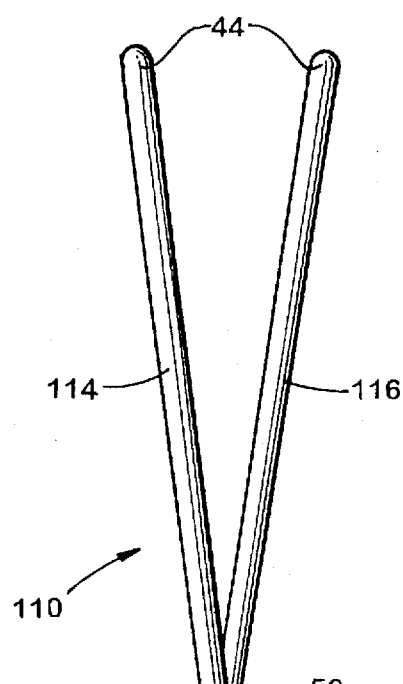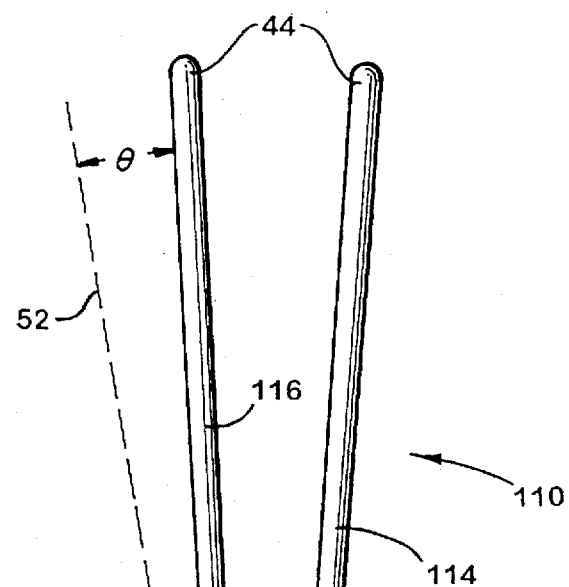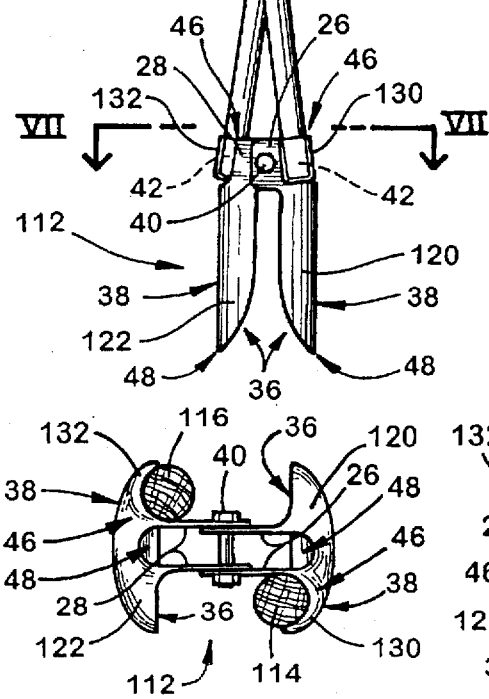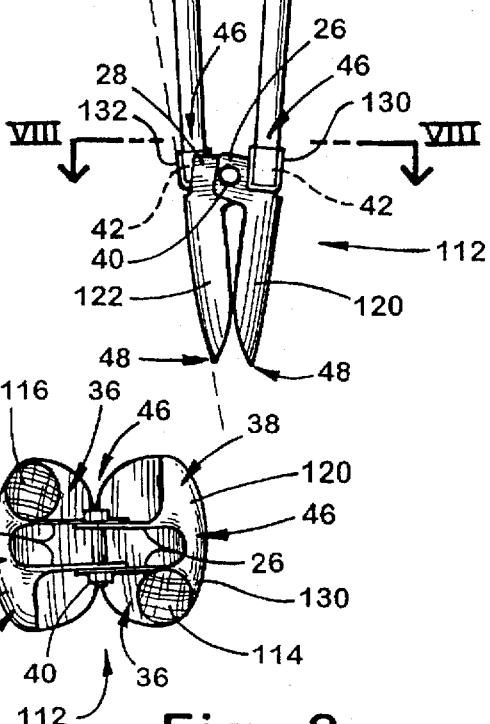

DIGGING TOOL

BACKGROUND OF THE INVENTION

The invention relates to digging tools, and more particularly to post hole digging implements and the like.

A variety of digging implements are known and readily available for digging holes, and more specifically post holes, in the earth. These implements include earth augers and the familiar clamshell style post hole digger, for example. The known clamshell style post hole digger is, in its simplest concept, two shovels aligned in face-to-face orientation and pivotally connected together near the heel of the shovel blade. Typically, the blades are stamped metal members with a straight spine and the handles extend from the heel of the shovel, along a straight line that runs through the spine of the blade. The common clamshell style post hole digger is manipulated by a user between an open position and a closed position. In the open position, the two blades are generally parallel with one another and the two handles extend away from the blades in a generally parallel orientation with one another. In the closed position, the common clamshell style post hole digger has a generally V-shaped configuration with tips of the shovel blades abutting one another and the handles extending away from the shovel tips and divergently away from one another.

As a simple fact of geometry, the common clamshell style post hole digger cannot be used to dig a generally cylindrical post hole that is any deeper than a little more than the linear distance from the tips of the shovel blades to the axis of pivot between the shovel blades. Thus, as the hole is deepened beyond the depth of the shovel blades, the top of the hole must be increasingly widened to accommodate the spread of the handles when the common clamshell style post hole digger is in the closed position to remove dirt or the like from the bottom of the hole.

Thus, the common post hole digger is inherently flawed by requiring additional dirt removal and effort to widen the top of the hole to accommodate the spread of the handles in the closed position.

SUMMARY OF THE INVENTION

A digging tool according to the invention provides a generally cylindrical hole, without wasted effort to widen the top of the hole to accommodate handles that must be spread excessively wide. The invention remedies the inherent flaw of prior post hole diggers with an offset handle. The invention has a first blade and a first handle with a first end connected with the first blade. The first handle extends away from the first blade to an opposing grip end. The tool further has a second blade and a second handle with a first end connected with the second blade. The second handle extends away from the second blade to an opposing grip end. Each of the first and second blades has a face. The first and second blades are arranged in face-to-face orientation and are pivotally connected to move clamshell style between open and closed positions. Further, the second handle is offset relative to the second blade so the first and second handles diverge away from one another, from the blades to the grip ends, when the tool is in the closed position, and so the handles converge toward one another to an overlap point and then diverge away from one another, from the blades to the grip ends, when in the open position.

In another aspect of the invention, the first blade and the first handle comprise a first shovel and the second blade and the second handle comprise a second shovel that is substantially similar to the first shovel. The first and second shovels are pivotally interconnected with a pivot pin in face-to-face orientation, clamshell style. In a further aspect of the invention, the second blade has a heel near the second handle and has an opposing tip. A reference line extends through the tip and the heel. And, the second handle and the reference line define an inclusive angle from about 8 degrees to about 16 degrees. In another aspect of the invention, each blade includes a cooperating pivot connector with the pivot connectors being interconnected with a pivot pin to couple the blades in pivoting engagement. In addition to the second handle being offset, the first handle may be offset relative to the first blade, similar to the second handle and second blade, in another aspect of the invention.

These and other features, objects, and benefits of the invention will be recognized by one having ordinary skill in the art and by those who practice the invention, from the specification, the claims, and the drawing figures.

BRIEF DESCRIPTION OF THE DRAWINGS

FIG. 1 is a side elevational view of a digging tool according to the invention in an open position;

FIG. 2 is the view of FIG. 1, showing the tool in a closed position;

FIG. 3 is a cross-sectional view along section line III—III of FIG. 1;

FIG. 4 is a cross-sectional view along section line IV—IV of FIG. 2;

FIG. 5 is a side elevational view of a second embodiment of a digging tool according to the invention in an open position;

FIG. 6 is the view of FIG. 5, showing the tool in a closed position;

FIG. 7 is a cross-sectional view along section line VII—VII of FIG. 5; and

FIG. 8 is a cross-sectional view along section line VIII—VIII of FIG. 6.

DESCRIPTION OF THE PREFERRED EMBODIMENTS

A first embodiment of digging tool or post hole digger according to the invention is generally shown in the drawing FIGS. 1–4 and identified by the reference number 10. A second embodiment of digging tool or post hole digger according to the invention is generally shown in the drawing FIGS. 5–8 and identified by the reference number 110. Because the two tools 10 and 110 are substantially similar, the tool 10 will be described in greater detail, with only the differences being addressed regarding tool 110. Further, the same reference numbers will be used to identify substantially similar parts of each of the tools 10 and 110, with only the differing parts that are discussed having differing reference numbers.

The tool 10 has a digging head 12 and a pair of handles 14 and 16. The digging head 12 has a pair of blades 20 and 22 pivotally interconnected, clamshell style, to pivot between open (FIGS. 1 and 3) and closed (FIGS. 2 and 4) positions.

In a typical construction of the tool 10, the handles 14 and 16 may be elongated members that have a first end 42 with a generally square cross section and a length and width of about 1¼ inches (32 mm), and that have an opposing grip end 44 with a generally circular cross section and a diameter of about 1¼ inches (32 mm). Further, the handles 14 and 16 may typically have a length of about 44 inches (1118 mm). Of course, the specific dimensions of the handles, and of other components of the tool 10 will be dictated by the intended use of the tool and by the particular design specifications that are developed according to the chosen use, as will be understood by one having ordinary skill in the art. Further, the handles may be fabricated from any suitable structural material, including, but not limited to wood, plastic, and metal.

The digging head 12 includes a pair of shovel blades 20 and 22 that may be substantially similar if not identical, and adapted for face-to-face pivotal interconnection, clamshell style, as is generally shown in the drawing figures. More particularly, the blades 20 and 22 may be provided with pivot connectors 26 and 28 and handle couplers 30 and 32.

Each blade 20 and 22 may be one piece or may be a built up construction of a suitable structural material. The blade 20 or 22 may have a stamped or a stamped and welded metal construction, for example. Alternatively, the blade may have a molded plastic construction, for example. The specific material and construction of the tool 10 will, of course, be dictated by the specific use of the tool and by the preferences of the manufacturer, as will be understood by one having ordinary skill in the art.

Each blade 20 and 22 will preferably have an at least slightly concave face 36 with an opposing convex back 38. The pivot connectors 26 and 28 are adapted for pivoting interconnection with a pivot pin 40, when the blades 20 and 22 are arranged in a face-to-face orientation. Thus, the blades will be pivotally connected to pivot clamshell style between an open position (FIGS. 1 and 3) in which the tool may be thrust, or the like, to at least partially imbed the digging head into dirt or other material that is to be dug, and a closed position (FIGS. 2 and 4) in which the digging head closes around dug material that is to be removed.

The first end 42 of each of the handles 14 and 16 is connected with its respective handle coupler 30 or 32 of its respective shovel blade 20 or 22. The handles extend in the same general direction, away from the shovel blades to the opposing grip ends 44. The handles are secured onto the handle couplers by through bolting with bolts 50, or by another suitable fastening method, as will be understood by one having ordinary skill in the art.

While various fastening methods may be used to secure the handles 14 and 16 to their respective handle coupler 30 or 32, it is noted that the use of through bolting allows lateral adjustment of clearance between the grip ends 44. That is, when the tool 10 is manipulated between the open and the closed positions, the grip ends 44 pass by one another with a given clearance between the grip ends 44. That by-pass clearance can be adjusted by inserting a spacer between the handle 14 or 16 and the handle coupler 30 or 32, respectively, near an upper end of the handle coupler. The spacer may be a washer, for example, that is placed around the upper bolt 50 and between the handle 14 or 16 and its respective handle coupler 30 or 32.

The handle 16 is offset from the blade 22 (FIG. 2). As is generally shown in the drawing figures, each handle may be offset. More particularly, each blade 20 and 22 has a heel 46 and a tip 48 with a reference line 52 extending through the heel and the tip. An angle theta ($\Theta$) is defined between the reference line 52 and the corresponding handle 16 or 14 as is shown in drawing FIG. 2. The offset of the handle 16 or 14 from the blade 22 or 20, respectively, or the deflection of angle theta will most preferably be from about 8 to about 16 degrees, although smaller and greater angles will also work.

The angle theta, of course, depends upon the specification of the particular design as will be understood by one having ordinary skill in the art.

In use, the handles 14 or 16 will be manipulated to open the digging head, so the tips 48 are separated and the blades 20 and 22 may be thrust or otherwise imbedded in a material to be dug, such as dirt (FIGS. 1 and 3). As shown and described, the handles 14 and 16 will converge from the blades 20 and 22 to an overlap point 56 and then diverge to the grips 44, with the grips being separated about 10 inches (254 mm), more or less. With the blades 20 and 22 at least partially imbedded in a material to be dug, such as dirt, the handles 14 and 16 are manipulated to close the digging head (FIGS. 2 and 4).

As seen in FIG. 1, the handles 14 and 16 criss-cross or overlap at the overlap point 56 and the grips 44 are spread about the same as, or a little more than, the distance across the digging head 12, when the tool 10 is in the open position. Alternatively, when the tool 10 is in the closed position as shown in FIG. 2, the handles 14 and 16 do not criss-cross or overlap, but extend divergently from the digging head 12 to the grips 44. The grips 44, however, are spread or separated from one another about the same in the closed position as they are in the open position, namely about the same as, or a little more than, the distance across the digging head 12. This is contrasted with the common clamshell style post hole digger previously known, in which the handle grips are spread at least about five times as far in the closed position, as compared with the open position.

In the second embodiment 110 of the invention, the handles 114 and 116 are generally cylindrical, pole-like members. In a typical construction of the tool 110, the handles 114 and 116 may also be generally tubular with a diameter of about 1¼ inches (32 mm). As with the handles 14 and 16, described above, the handles 114 and 116 may typically have a length of about 44 inches (1118 mm). Of course, the specific dimensions of the handles, and of other components of the tool 110 will be dictated by the intended use of the tool and by the particular design specifications that are developed according to the chosen use, as will be understood by one having ordinary skill in the art. Further, the handles may be fabricated from any suitable structural material, including, but not limited to wood, plastic, and metal.

As with the digging head 12, the digging head 112 includes a pair of shovel blades 120 and 122 that may be substantially similar if not identical, and adapted for face-to-face pivotal interconnection, clamshell style, as is generally shown in the drawing figures and discussed in greater detail above regarding digging head 12. More particularly, the blades 120 and 122 may be provided with pivot connectors 26 and 28 and handle couplers 130 and 132. Each blade 120 and 122 may also be one piece or may be a built up construction of a suitable structural material, also as is discussed in greater detail above regarding digging head 12. The only material difference between digging head 112 and digging head 12 is the handle couplers 130 and 132 that are adapted to cooperate with the circular cross section of handles 114 and 116, rather than the handle couplers 30 and 32 that are adapted to cooperate with the square cross section of handles 14 and 16.

Each of the handles 114 and 116 has a first end 42 connected with its respective handle coupler 130 or 132 of its respective shovel blade 120 or 122. The handles extend in the same general direction, away from the shovel blades to the opposing grip ends 44. The handles are preferably secured into the handle couplers 130 and 132 by through bolting or by another suitable fastening method, as will be understood by one having ordinary skill in the art.

The use of tool 110 is substantially as is described above regarding tool 10.

It will be understood by one having ordinary skill in the art and by those who practice the invention, that various modifications and improvements may be made without departing from the spirit of the disclosed concept. The scope of protection afforded is to be determined by the claims and by the breadth of interpretation allowed by law.

I claim:

1. A digging tool comprising:

a first blade, the first blade having a tip and an opposing heel, having a length between the tip and the heel, having a first handle coupler that extends from the heel in a direction generally away from the tip, having a pivot connector, and having a face;

a first handle that has a first end connected with said first handle coupler and that extends generally linearly away from said first blade to an opposing grip end;

a second blade, the second blade having a tip and an opposing heel, having a length between the tip and the heel, having a second handle coupler that extends from the heel in a direction generally away from the tip, having a pivot connector, and having a face, said first and said second blades being arranged in face-to-face orientation with the first handle coupler spaced apart from the second handle coupler, and being pivotally connected to move clamshell style between open and closed positions; and a second handle that has a first end connected with said second handle coupler and that extends generally linearly away from said second blade to an opposing grip end, said first handle being angled relative to said first handle coupler and said second handle being angled relative to said second handle coupler, so said first and said second handles slightly diverge away from one another, without overlapping, from each said blade to said grip end of each said handle, when in said closed position, and so said first and said second handles converge toward one another, from each said blade to an overlap point and then diverge away from one another from said overlap point to said grip end of each said handle, when in said open position.

2. The tool defined in claim 1, wherein a first reference line extends through each of said heel and said tip of the first blade, wherein the first handle and the reference line define an angle therebetween, and wherein the angle is in a range of about eight degrees to about sixteen degrees, wherein a second reference line extends through each of the heel and the tip of the second blade, wherein said second handle and said second reference line define an angle therebetween, and wherein said angle is in a range of about eight degrees to about sixteen degrees.

3. A digging tool comprising:

a first shovel that has a face and an opposing back, a tip and an opposing heel, a first pivot connector near said heel, a first handle coupler that extends from the heel in a direction generally away from the tip, a first handle that extends generally linearly from said heel to a grip end, in a direction generally away from said tip, and a first reference line that extends though each of said tip and said heel, said first handle being angled from said first reference line toward a direction that is generally perpendicular to said face and away from said back;

a second shovel that has a face and an opposing back, a tip and an opposing heel, a second pivot connector near said heel, a second handle coupler that extends from the heel in a direction generally away from the tip, a second handle that extends generally linearly from said heel to a grip end, in a direction generally away from said tip, said first and said second shovels being arranged in face-to-face orientation with said tips and said heels of said first and said second shovels generally aligned, and with the faces of said first and said second shovels and the first and second handle couplers being spaced apart; and a cooperating pivot pin that interconnects said pivot connector of each of said first and said second shovels to connect said first and said second shovels clamshell style in pivotal engagement, to move between a closed position in which the shovel tips are near one another and the first and second handles diverge away from one another without overlapping, and an open position in which the shovel tips are spaced apart from one another and the first and second handles converge toward one another, from the shovels to an overlap point, and then diverge away from one another from the overlap point to the grip ends.

4. The tool defined in claim 3, wherein said first handle and said first reference line define an angle therebetween, and wherein said angle is in a range of about eight degrees to about sixteen degrees.

5. The tool defined in claim 4, wherein said second handle and said second reference line define an angle therebetween, and wherein said angle is in a range of about eight degrees to about sixteen degrees.

6. A clamshell post hole digger comprising:

first and second clamshell shovel blades pivotally attached together about a transverse pivot axis to operate in a clamshell fashion, said shovel blades having an open position wherein outer ends of said shovel blades are spaced apart in a digging position, and having a closed position wherein the outer ends of said shovel blades are pivoted together; and a pair of handles operably connected with said shovel blades to open and close said shovel blades, each handle being attached to one of said shovel blades and extending generally linearly away from said shovel blades to opposing grip ends, said handles being laterally offset in the direction of the pivot axis so the handles pivot through spaced planes and pass each other to and from a criss-crossed position without coming into contact, said handles being attached to said shovel blades at inclined angles such that said handles are criss-crossed when said shovel blades are in said open position and said handles are uncrossed when said shovel blades are in said closed position.

7. The clamshell post hole digger defined in claim 6, wherein each shovel blade has a tip and an opposing heel, wherein reference lines pass through the tip and heel of the shovels, wherein the inclined angles are defined between the respective handle and reference line, and wherein the inclined angles are in a range of about eight degrees to about sixteen degrees.

* * * * *